United States Patent [19]
Dampier

[11] 4,403,020
[45] Sep. 6, 1983

[54] ELECTROCHEMICAL CELL

[75] Inventor: Frederick W. Dampier, Waltham, Mass.

[73] Assignee: GTE Laboratories Incorporated, Waltham, Mass.

[21] Appl. No.: 354,274

[22] Filed: Mar. 3, 1982

[51] Int. Cl.³ .............................................. H01M 6/14
[52] U.S. Cl. ..................................... 429/91; 429/101; 429/197
[58] Field of Search .................. 429/101, 91, 197, 199

[56] References Cited

U.S. PATENT DOCUMENTS 4,293,622  10/1981  Marincic ......................... 429/101 X

OTHER PUBLICATIONS

Marincic, N. et al., "Recent Developments in Miniature Li/SoCl₂ Cells", Progress in Batteries and Solar Cells, vol. 3, (1980), pp. 84–86.

*Primary Examiner*—Anthony Skapars
*Attorney, Agent, or Firm*—David M. Keay

[57] ABSTRACT

A primary electrochemical cell having an oxidizable active anode, a cathode current collector, and an electrolytic solution comprising a liquid cathode material and an electrolyte solute dissolved therein. The cathode current collector includes two catalyst elements; the first is a cylinder of porous carbon material, and the second is a stack of discs of porous nickel material adjacent to one end of the porous carbon element. The amounts of the anode material, electrolytic solution, and porous carbon material are related such that the effectiveness of the porous carbon material as an active catalyst is exhausted prior to the anode material and the electrolytic solution, at which time the porous nickel material becomes effective as the active catalyst material. The electrochemical cell produces a steady output voltage at one level while the porous carbon material is the active catalyst and produces an output voltage at a lower level when the porous nickel material becomes the active catalyst. The drop in output voltage provides a signal that the cell is approaching the end of its useful discharge life.

11 Claims, 2 Drawing Figures

4,403,020

ELECTROCHEMICAL CELL

CROSS-REFERENCE TO RELATED APPLICATION

This application is related to application Ser. No. 354,273 filed concurrently herewith by Frederick W. Dampier and Carl R. Schlaikjer entitled "Primary Electrochemical Cell" and assigned to the assignee of the present application.

BACKGROUND OF THE INVENTION

This invention relates to primary electrochemical cells. More particularly, it is concerned with primary electrochemical cells having an oxidizable active anode material, a cathode current collector, and an electrolytic solution comprising reducible liquid cathode material and an electrolyte solute dissolved therein.

A particularly effective class of primary electrochemical cells which employs soluble or liquid cathode materials, as opposed to more conventional solid cathode cells, has undergone rapid development in recent years. In these cells the active cathode material is usually a fluid solvent for an electrolyte solute which provides conductivity. The active anode of these cells is usually lithium or another highly electropositive metal. During discharge the solvent is electrochemically reduced on a cathode current collector to yield ions, e.g. halide ions, which react with positive metal ions from the anode to form insoluble metal salts, e.g. metal halides. The cathode current collector does not take part in the reaction itself, but simply provides a support on which the reaction can occur, supplying electrons given up during the oxidation of the anode material.

Electrochemical cells of the foregoing type typically produce an output voltage which remains relatively constant to the end of its discharge life when the voltage falls very rapidly. For many applications such end of discharge behavior presents no problems. In certain applications, however, it is desirable that a signal be provided by the cell indicating that it is approaching the end of its useful life. An electrochemical cell employing a cathode current collector having a first catalyst of porous carbon material and a second catalyst or porous nickel material in which the output voltage drops from one level to another level near the end of the discharge life of the cell is described and claimed in the above-mentioned application of Dampier and Schlaikjer.

SUMMARY OF THE INVENTION

Electrochemical cells in accordance with the present invention employ the teachings of the aforementioned application of Dampier and Schlaikjer while providing cells of improved construction. A primary electrochemical cell in accordance with the present invention includes an outer case, an anode disposed within the outer case, and a cathode current collector disposed within the outer case and encircled by the anode. A separator of non-conductive material is interposed between the anode and the cathode current collector. The outer case contains an electrolytic solution which is in contact with the anode and cathode current collector and comprises a reducible liquid cathode material and an electrolyte solute dissolved therein. The cathode current collector includes a first catalyst of porous carbon material for reducing the liquid cathode material and a second catalyst of porous nickel material for reducing the liquid cathode material.

An electrochemical cell in accordance with the invention produces a constant output voltage while the first catalyst of porous carbon material serves as the active catalyst at which the liquid cathode material is reduced. When the carbon material of the first catalyst loses its effectiveness by virtue of the reaction products accumulating at the exposed surfaces of the porous carbon material, the reduction reaction takes place at the exposed surfaces of the porous nickel material, at a lower voltage. That is, the amounts of the anode material, electrolytic solution, and porous carbon material in the cell are related such that the porous carbon material as an active catalyst is exhausted prior to the anode material and the electrolytic solution. Thus, when the porous carbon material in effect is exhausted, the porous nickel material becomes effective as the active catalyst reducing the output voltage of the electrochemical cell. A signal that the cell is approaching the end of its useful operating life is thereby provided.

For a better understanding of the present invention, together with other and further objects, advantages, and capabilities thereof, reference is made to the following discussion and appended claims in connection with the above described drawings.

DETAILED DESCRIPTION OF THE INVENTION

In the following specification and claims when an electrochemical cell is designated as having a particular anode or cathode material, that anode or cathode, or anode or cathode material, means the electrochemically active component, and not the non-consummable electrically conducting, inert or catalytic current collector or anode current collector. Such an electrode may be in contact with, or form part of, a suitable substrate, in the case of the anode, or will be a fluid in the case of the cathode. The catalyst materials defined herein are active only in the sense that they actively catalyze the reduction of the liquid cathode. The catalysts are not themselves reduced under the desired cell operating conditions.

As explained in the aforementioned application of Dampier and Schlaikjer, the cathode current collectors of electrochemical cells in accordance with the present invention employ two catalysts, specifically a primary catalyst of porous carbon material and a secondary catalyst of porous nickel material. Since the liquid cathode material of the cell is reduced at a higher potential on carbon than on nickel, the liquid cathode material is reduced on the surface of the porous carbon material producing a resulting cell output voltage. Eventually the porous carbon is effectively exhausted by virtue of the porous surfaces being passivated by the presence of the products of the reduction reaction which tend to prevent the liquid cathode material from reaching the active catalytic surfaces. The porous nickel material then becomes the active catalyst, and the cell produces an output voltage at a lower level.

Figure 1:
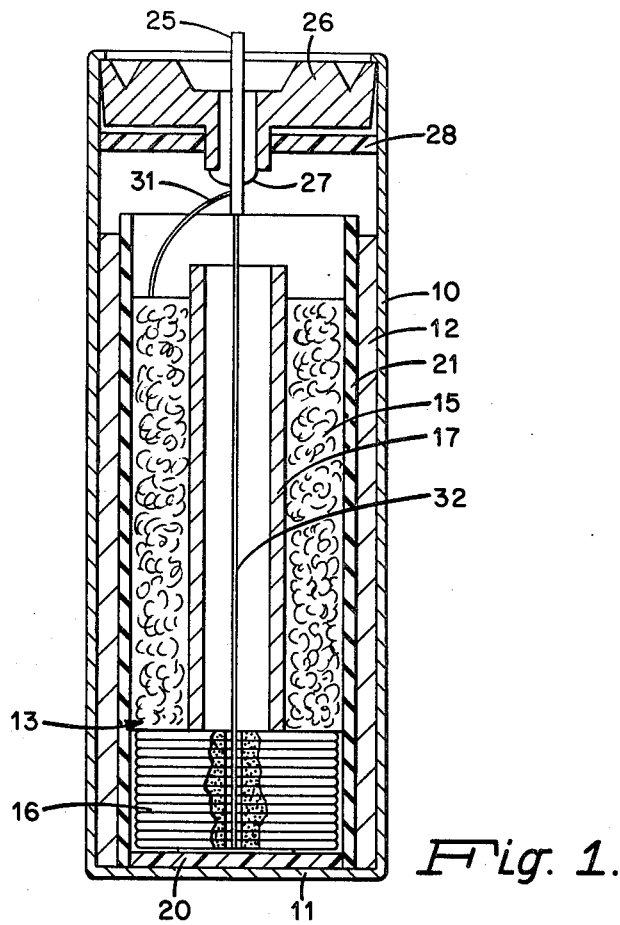
FIG. 1 is a view in cross section illustrating a primary electrochemical cell in accordance with the present invention.

An electrochemical cell in accordance with the present invention is illustrated in FIG. 1. The cell includes an outer case 10 which is a hollow cylinder or tubular casing of conductive material. The casing 10 is open at one end and the opposite end is closed by a bottom end wall 11. An anode 12 of an oxidizable material is mechanically and electrically connected to the inner surface of the side walls of the casing 10. Mounted within the casing 10 and encircled by the anode 12 is a hybrid cathode current collector 13 which consists of two catalyst elements. The first catalyst element 15 is of porous carbon material, and the second catalyst element 16 is of porous nickel material. The first catalyst element 15 is a cylindrical member having a tube 17 of inert material centrally thereof. The second catalyst element 16 of the cathode current collector 13 may be a stack of discs of porous nickel plaque disposed adjacent to one end of the cylindrical porous carbon element 15. An insulating disc 20 separates the stack of discs of the second catalyst element 16 from the end wall 11 of the casing. An insulating separator 21 of cylindrical configuration is interposed between the anode 12 and the elements 15 and 16 of the cathode current collector 13. The interior of the outer casing 10 contains an electrolytic solution which comprises a fluid, reducible cathode material and an electrolyte solute dissolved therein.

In a cell of cylindrical configuration as shown and described the outer casing 10, and more particularly the bottom end wall 11, provides a first exterior terminal of the cell. A second exterior terminal 25 is centrally positioned at the open end of the casing 10 within a metal closure member 26 welded to the casing. The second exterior terminal 25 passes through a glass-to-metal seal 27 in the closure member 26. A protective disc or plug 28 of insulating material is positioned between the closure member 26 and the components within the cell. The interior portion of the second exterior terminal 25 is connected to the porous carbon element 15 by a conductive lead 31, which may be protected by an insulating coating, inserted into the element 15 to provide good electrical contact therewith. The second exterior terminal 25 is directly connected to the stack of porous nickel discs of the second element 16 by a T-shaped wire member 32 which passes through central openings in the discs.

The outer casing 10 may be any of various conductive materials which are inert to the chemicals contained within the cell, 304L stainless steel being a preferred material. The anode 12 is an oxidizable material, preferably an alkali metal or an alkaline earth metal, and more specifically lithium metal. The anode may be formed by pressing a sheet of lithium foil into an expanded nickel grid which is spot welded to the interior surface of the outer casing. The electrolytic solution within the cell comprises a reducible liquid cathode solvent such as a fluid oxyhalide, a fluid non-metallic oxide, a fluid non-metallic halide, or mixtures thereof. An electrolyte solute is dissolved therein to raise its conductivity. Thionyl chloride is a preferred solvent and lithium tetrachloroaluminate is a preferred solute for use therewith. A thorough discussion of various useful anode materials, cathode solvents, and electrolyte solutes is provided in U.S. Pat. No. 4,219,443 to Keith A. Klinedinst and Francis G. Murphy, which patent is incorporated herein by reference.

The cylindrical porous carbon element 15 may be formed of compressed carbon black containing a suitable binder. The nickel material of the second catalyst element 16 may be sintered nickel or nickel powder or any of various nickel alloys or mixtures thereof. The nickel material may be suitably heat treated to form a nickel oxide film of desired thickness. The particular porous nickel material can be selected so as to determine the cell operating potential when the nickel material becomes the active catalyst. The arrangement of a stack of nickel plaque discs for the second catalyst element 16 permits ready fabrication of the cell and also permits utilizing commercially available material without the necessity of forming a relatively large member of porous nickel by compression and sintering techniques. The exact point during the discharge life of the cell at which the output voltage drops from the first to the second level is determined by the proportion of carbon material and nickel material present in the cathode current collector. Sufficient anode material and electrolytic solution are provided to insure that the operating life of the cell is limited by the cathode current materials and not by the anode material or electrolytic solution.

The use of a tubular design for the porous element 15 reduces its coulombic capacity so that the cell operation will be limited by the carbon catalyst. The tubular configuration also allows extra volume for storage of the excess electrolytic solution which insures that the operating life of the cell will be limited by the porous carbon and not the electrolytic solution. In addition, the use of a tubular element facilitates mass transfer inside the carbon element by reducing its thickness so that the cell can be efficiently discharged at practical rates within a period of few days. Thus, accelerated quality control testing of cells at higher than normal operating rates can be performed on a production basis.

AA size cells having an outside diameter of 0.530 inch and a height of 1.90 inches were fabricated. Each anode 12 was 0.040 inch thick lithium foil 1.30×1.52 inch prior to being rolled into a cylinder and pressed against the interior surface of the cell casing 10. The porous nickel element 16 was a stack of 13 discs of porous sintered nickel plaque of the type commonly used in the fabrication of nickel electrodes for nickel/cadmium electrochemical cells. The nickel plaque had an average conglomerate size of 10 nm and a specific area of 1.75 $m^2/cm^3$. Each disc was 0.375 inch in diameter and 0.023 inch thick with a central opening approximately 0.05 inch in diameter to accommodate the T-shaped wire lead 32. Each of the discs weighed 0.102 g. The porous carbon element 15 was of Shawinigan acetylene black with a 10% by weight binder of polytetrafluoroethylene. The material was extruded to form a hollow cylindrical element 15 1.00 inch high with an outside diameter of 0.385 inch and an inside diameter of 0.20 inch weighing 0.331 g. The electrolytic solution within the cell was 1.8 M lithium tetrachloroaluminate dissolved in thionyl chloride.

Figure 2:
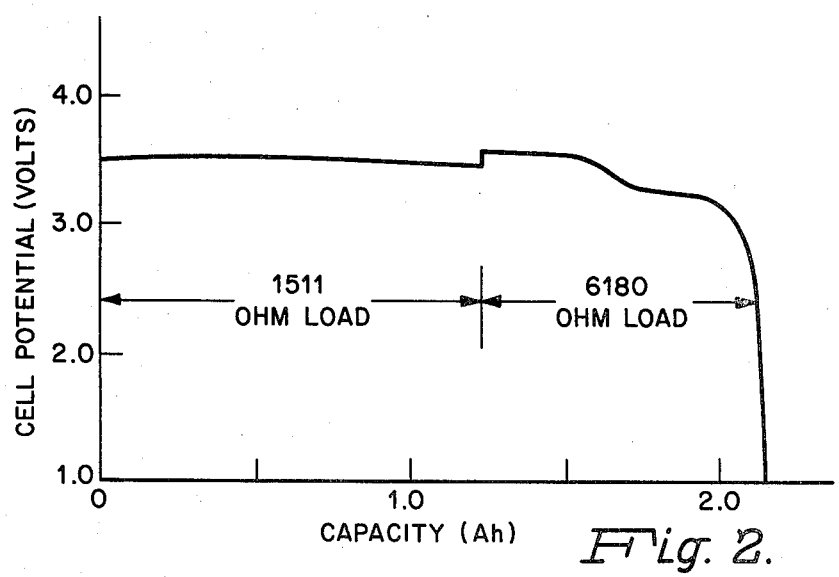
FIG. 2 is a graph showing a curve of cell voltage versus discharge capacity of a cell in accordance with the present invention operating under test conditions.

The discharge characteristic of a cell constructed as described is shown in FIG. 2. The cell was operated with a load of 1511 ohms, producing an anode current density of ~0.25 $mA/cm^2$. After a large portion of the cell capacity had been consumed at this accelerated rate, the load was changed to 6180 ohms.

While there has been shown and described what is considered a preferred embodiment of the present invention, it will be obvious to those skilled in the art that various changes and modifications may be made therein without departing from the invention as defined by the appended claims.

What is claimed is:

1. A primary electrochemical cell comprising
   an outer case;
   an anode disposed within the outer case;
   a cathode current collector disposed within the outer case and encircled by the anode;
   a separator of non-conductive material interposed between the anode and the cathode current collector; and
   an electrolytic solution, in contact with the anode and cathode current collector, comprising a reducible liquid cathode material and an electrolyte solute dissolved therein;
   the cathode current collector including a first catalyst of porous carbon material for reducing the liquid cathode material and a second catalyst of porous nickel material for reducing the liquid cathode material.

2. A primary electrochemical cell in accordance with claim 1 wherein
   the amounts of active anode material, electrolytic solution, and porous carbon material are related such that the effectiveness of the porous carbon material as an active catalyst is exhausted prior to the anode material and electrolytic solution, whereby the porous nickel material becomes effective as the active catalyst material reducing the output voltage of the electrochemical cell.

3. A primary electrochemical cell in accordance with claim 2 wherein
   said cathode current collector includes a first catalyst element consisting essentially of porous carbon material as a catalyst and a second catalyst element consisting essentially of porous nickel material as a catalyst.

4. A primary electrochemical cell in accordance with claim 3 wherein
   the anode is of a material selected from the group consisting of alkali metals and alkaline earth metals; and
   the reducible liquid cathode material is selected from the group consisting of fluid oxyhalides, fluid non-metallic oxides, fluid non-metallic halides, and mixtures thereof.

5. A primary electrochemical cell comprising
   a hollow, outer cell casing of conductive material forming a first exterior terminal of the electrochemical cell;
   an anode disposed within the outer cell casing and in mechanical and electrical contact therewith;
   a cathode current collector disposed within the outer cell casing and encircled by the anode;
   a porous separator of non-conductive material interposed between the anode and the cathode current collector;
   an electrolytic solution within the casing, in contact with the anode and cathode current collector, comprising a reducible liquid cathode material and an electrolyte solute dissolved therein;
   the cathode current collector including a first catalyst element of porous carbon material for reducing the liquid cathode material and a second catalyst element of porous nickel material for reducing the liquid cathode material, the first and second catalyst elements being electrically connected; and
   a second exterior terminal of the electrochemical cell electrically insulated from the first exterior terminal and electrically connected to the first and second catalyst elements of the cathode current collector.

6. A primary electrochemical cell in accordance with claim 5 wherein
   the amounts of active anode material, electrolytic solution, and porous carbon material are related such that the effectiveness of the porous carbon material as an active catalyst is exhausted prior to the anode material and electrolytic solution, whereby the porous nickel material becomes effective as the active catalyst material reducing the output voltage of the electrochemical cell.

7. A primary electrochemical cell in accordance with claim 6 wherein
   said hollow, outer cell casing is generally cylindrical in shape having an opening at one end and an end wall closing the opposite end;
   said anode is of generally hollow cylindrical configuration and is in mechanical and electrical contact with the inner surface of the outer cell casing;
   said first catalyst element of the cathode current collector is of generally hollow cylindrical shape;
   said second catalyst element of the cathode current collector is of generally cylindrical shape of approximately the same outside diameter as said first catalyst element, said second catalyst element being disposed adjacent to one end of the cylindrical first catalyst element between said one end thereof and said end wall of the outer cell casing;
   said porous separator is of generally hollow cylindrical configuration and encircles the first and second catalyst elements;
   said second exterior terminal is located centrally of said opening at the one end of the outer cell casing and has an interior portion extending interior of the outer cell casing; and including
   a first electrical connection between said interior portion of the second exterior terminal and the first catalyst element, and a second electrical connection between said interior portion of the second exterior terminal and the second catalyst element.

8. A primary electrochemical cell in accordance with claim 7 wherein
   the anode is of a material selected from the group consisting of alkali metals and alkaline earth metals.

9. A primary electrochemical cell in accordance with claim 8 wherein
   the reducible liquid cathode material is selected from the group consisting of fluid oxyhalides, fluid non-metallic oxides, fluid non-metallic halides, and mixtures thereof.

10. A primary electrochemical cell in accordance with claim 7 wherein
    the anode includes lithium metal; and
    the reducible liquid cathode material comprises thionyl chloride.

11. A primary electrochemical cell in accordance with claim 7 wherein
    said second catalyst element comprises a plurality of discs of porous nickel material arranged in a stack.

* * * * *